United States Patent
Watanabe

(10) Patent No.: US 7,787,020 B2
(45) Date of Patent: Aug. 31, 2010

(54) APERTURE VALUE CALCULATION FOR A DIGITAL CAMERA CAPABLE OF DISPLAYING AND/OR RECORDING A MOVIE IMAGE

(75) Inventor: Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 447 days.

(21) Appl. No.: 11/893,482

(22) Filed: Aug. 16, 2007

(65) Prior Publication Data

US 2008/0049117 A1    Feb. 28, 2008

(30) Foreign Application Priority Data

Aug. 22, 2006 (JP) .............................. 2006-225696

(51) Int. Cl.
*H04N 5/225* (2006.01)
*H04N 5/232* (2006.01)
*H04N 5/238* (2006.01)

(52) U.S. Cl. ..................... 348/221.1; 348/350; 348/363

(58) Field of Classification Search .............. 348/220.1, 348/221.1, 350, 354, 355, 356, 363
See application file for complete search history.

(56) References Cited

U.S. PATENT DOCUMENTS

| | | | |
|---|---|---|---|
| 4,710,013 A | | 12/1987 | Wong |
| 5,600,399 A | * | 2/1997 | Yamada et al. ................. 396/51 |
| 6,882,369 B1 | * | 4/2005 | Ito ............................. 348/345 |
| 6,954,233 B1 | * | 10/2005 | Ito ............................. 348/350 |
| 7,280,150 B2 | * | 10/2007 | Kikuchi et al. .............. 348/363 |
| 7,292,280 B2 | * | 11/2007 | Yamazaki et al. ........... 348/363 |
| 7,365,788 B2 | * | 4/2008 | Ito ............................. 348/335 |
| 7,463,303 B2 | * | 12/2008 | Ito ............................. 348/353 |
| 7,570,299 B2 | * | 8/2009 | Kuwakino ................... 348/350 |
| 7,576,796 B2 | * | 8/2009 | Kanayama .................. 348/350 |
| 2003/0174232 A1 | * | 9/2003 | Yahagi et al. ............... 348/345 |
| 2005/0140815 A1 | * | 6/2005 | Nakano et al. .............. 348/345 |
| 2005/0237417 A1 | * | 10/2005 | Miyasaka ................... 348/335 |
| 2005/0237421 A1 | | 10/2005 | Kosugiyama |
| 2006/0215041 A1 | * | 9/2006 | Kobayashi ............... 348/220.1 |
| 2007/0116450 A1 | * | 5/2007 | Kijima ....................... 396/111 |
| 2008/0024650 A1 | * | 1/2008 | Nomura et al. ............. 348/348 |
| 2008/0030594 A1 | * | 2/2008 | Terada .................... 348/221.1 |

FOREIGN PATENT DOCUMENTS

| | | |
|---|---|---|
| CN | 86106847 | 9/1987 |
| CN | 1691752 | 11/2005 |
| JP | 59-201029 | 11/1984 |
| JP | 2002-006208 | 1/2002 |

OTHER PUBLICATIONS

Chinese Office Action for Chinese Patent Application No. 200710140328.3, dated Jul. 25, 2008 (7 pgs.) with translation (9 pgs.).

* cited by examiner

*Primary Examiner*—John M Villecco
(74) *Attorney, Agent, or Firm*—Straub & Pokotylo; John C. Pokotylo

(57) ABSTRACT

There is disclosed a digital camera in which an aperture value is regulated between the open aperture value and a predetermined aperture value during acquisition of a movie image. The predetermined aperture value can be determined based on a range of a luminous flux for use in focal detection. The predetermined aperture value can be set, for example, such that the range between the open aperture value and the predetermined aperture value is suitable for a focal detecting operation.

5 Claims, 8 Drawing Sheets

APERTURE VALUE CALCULATION FOR A DIGITAL CAMERA CAPABLE OF DISPLAYING AND/OR RECORDING A MOVIE IMAGE

CROSS-REFERENCE TO RELATED APPLICATION

This application is based upon and claims the benefit of priority from prior Japanese Patent Application No. 2006-225696, filed on Aug. 22, 2006, the entire contents of which are incorporated herein by reference.

BACKGROUND OF THE INVENTION

1. Field of the Invention

The present invention relates to a digital camera capable of displaying and/or recording a movie image.

2. Description of the Related Art

In recent years, many of digital cameras have a so-called electronic finder in order to display a shot image as a movie image in a display device such as a liquid crystal monitor. Such a digital camera having the electronic finder does not have any optical finder in many cases. Some of the digital cameras are capable of not only shooting a still image but also recording the movie image.

For example, in Japanese Patent Application Laid-Open No. 59-201029, a digital single lens reflect camera is disclosed in which a quick return mirror (a movable mirror) is retreated from a photographing optical path, and a focal plane shutter is maintained at an open state to shoot the movie image.

In this single lens reflect camera disclosed in Japanese Patent Application Laid-Open No. 59-201029, during the shooting of the movie image, the movable mirror is retreated from the photographing optical path. On the other hand, in through the lens (TTL) phase difference auto focus (AF) for general use in the conventional single lens reflect camera, a luminous flux via the movable mirror is used in distance measurement. Therefore, the single lens reflect camera disclosed in Japanese Patent Application Laid-Open No. 59-201029 has a disadvantage that the camera cannot perform the distance measurement by the TTL phase difference AF. However, as disclosed in Japanese Patent Application Laid-Open No. 2002-6208, this disadvantage can be solved, when the movable mirror is constituted of a half mirror and a subject luminous flux transmitted through a photographing optical system is guided to both of an image pickup device and a phase difference AF sensor.

BRIEF SUMMARY OF THE INVENTION

In a digital camera of the present invention, an aperture value is regulated between an open aperture value and a predetermined aperture value during acquisition of a movie image. The predetermined aperture value can be determined based on, for example, a range of a luminous flux for use in focal detection.

One example of a constitution of the present invention can be represented as follows. A digital camera in which a movie image is displayed and/or recorded, comprising: a mirror section which is arranged in a photographing optical path and which separates, in first and second directions, a subject luminous flux transmitted through a photographing lens; a movie image output section which receives the subject luminous flux separated in the first direction to output movie image data; a focal detecting section which receives the subject luminous flux separated in the second direction during acquisition of the movie image to detect an out-of-focus amount of the photographing lens with a phase difference detection system; a focal adjustment section which adjusts a focus of the photographing lens based on the out-of-focus amount; an aperture mechanism disposed in the photographing lens; and a setting section which sets an aperture value of the aperture mechanism based on brightness of a subject during the acquisition of the movie image, a movable range of the aperture mechanism being limited to a range between the open aperture value and a predetermined aperture value.

The present invention can be understood as a method of controlling a digital camera.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A preferred embodiment of the invention is described below with reference to the accompanying drawings.

A preferable embodiment will hereinafter be described in accordance with a digital camera to which the present invention is applied. This digital camera has a so-called live view display function (also referred to as an electronic finder function) of displaying a movie image, formed on a image pickup device with a photographing lens, for observation of the subject image in a display device such as a liquid crystal monitor based on an output of this image pickup device. Moreover, a still image can be acquired in response to a photographing instruction from a camera user, and recorded in a recording medium. Furthermore, the movie image can be acquired in response to the photographing instruction from the camera user, and recorded in the recording medium.

Figure 1:
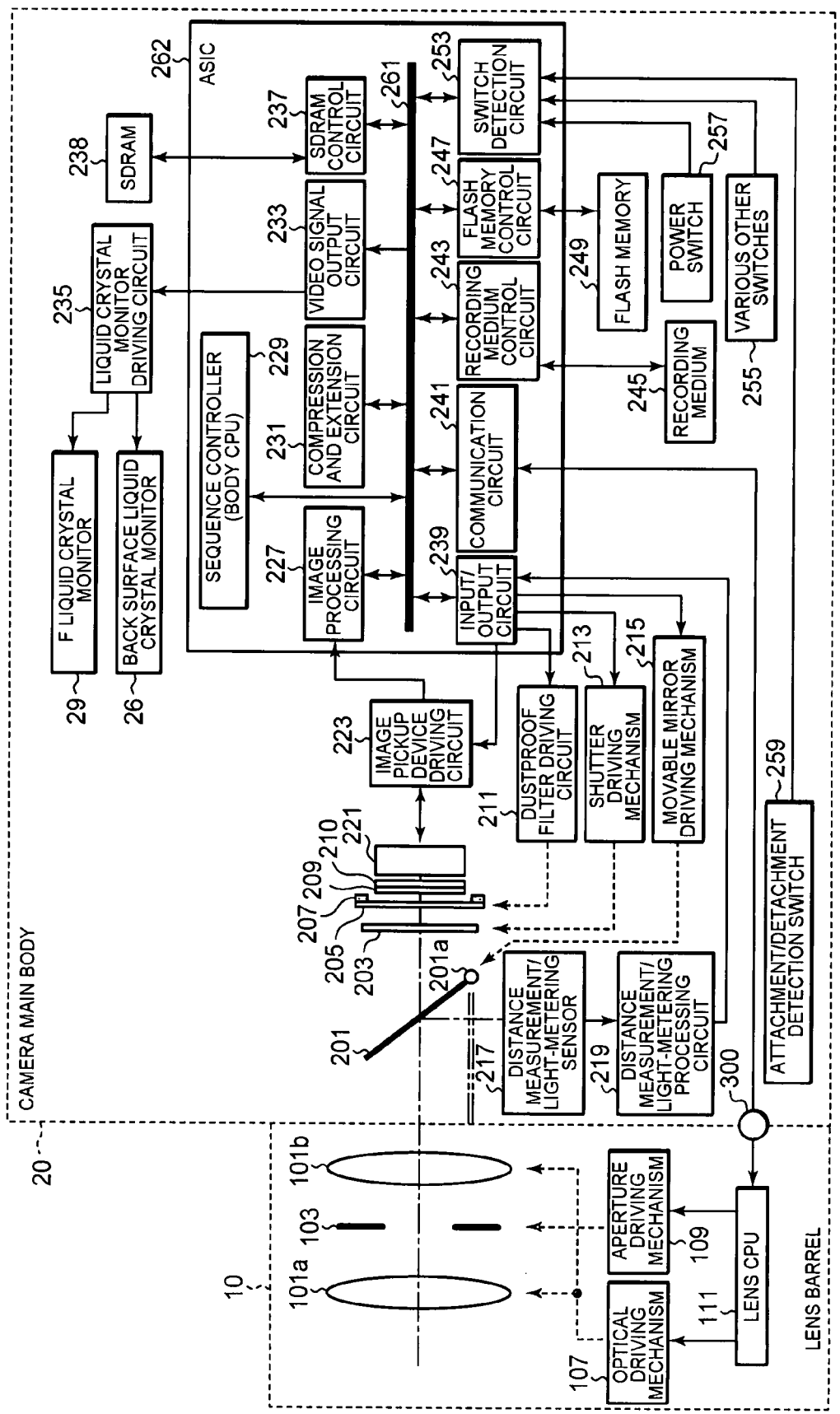
FIG. 1 is a block diagram showing the whole constitution of an electric system of a digital camera according to one embodiment to which the present invention is applied.

FIG. 1 is a block diagram mainly showing an electric system of the digital camera according to the embodiment of the present invention. A lens barrel 10 is detachably attached to a mount opening (not shown) of a front surface of a camera main body 20. A subject luminous flux obtained by a photographing lens including lenses 101a, 101b and the like disposed in the lens barrel 10 is guided into the camera main body 20 via the mount opening. In the present embodiment, the lens barrel 10 is constituted separately from the camera main body 20, and electrically connected to the camera main body 20 via a communication contact 300. An attached/detached state can be detected by an attachment/detachment detection switch 259 disposed at the camera main body 20.

In the lens barrel 10, the lenses 101a, 101b for focal adjustment and focal length adjustment (zooming) and an aperture 103 for adjustment of a numerical aperture are arranged. The lenses 101a and 101b are connected to an optical driving mechanism 107 so as to be driven by the optical driving mechanism 107, and the aperture 103 is connected to an aperture driving mechanism 109 so as to be driven by the aperture driving mechanism 109. The optical driving mechanism 107 and the aperture driving mechanism 109 are connected to a lens CPU 111, and this lens CPU 111 is connected to the camera main body 20 via the communication contact 300. The lens CPU 111 controls within the lens barrel 10. The lens CPU 111 controls the optical driving mechanism 107 to perform focusing and zoom driving, and further controls the aperture driving mechanism 109 to perform aperture control.

In a mirror box of the camera main body 20, a mirror member 201 (a mirror section) having a characteristic of transmitting a part of the subject luminous flux is arranged as an optical member to separate, in first and second directions, the subject luminous flux transmitted through the lenses 101a, 101b. This mirror member 201 is driven by a mirror member driving mechanism 215, and is rotatable along an axis centering on a rotary shaft 201a in a direction vertical to a drawing sheet. When the mirror member 201 is disposed at a position (a solid-line position in FIG. 1) tilted as much as 45 degrees with respect to an optical path of the lenses 101a, 101b, a part (e.g., 30%) of the subject luminous flux is reflected, and guided in a direction (the second direction) of a distance measurement/light-metering sensor 217 disposed at a bottom portion of the camera main body 20. The remaining (e.g., 70%) subject luminous flux is transmitted through the mirror member 201 and guided in a direction (the first direction) of a CCD 221.

Moreover, when the mirror member 201 is disposed substantially in parallel with the optical path of the lenses 101a, 101b at a retreated position (a position of a two-dot chain line in FIG. 1) where the subject luminous flux is not interrupted, all of the subject luminous flux is guided to the CCD 221. A structure of this mirror member 201 will be described later with reference to FIG. 2. It is to be noted that, in the present embodiment, a rotary center of the mirror member 201 is disposed in a lower part of the mirror box, but the present invention is not limited to this embodiment, and the rotary center may be set at an upper part of the box, or at a position parallel to either the left or the right of the drawing sheet. The rotary center of the mirror member 201 is arranged on a CCD 221 side, but the present invention is not limited to this embodiment, and the rotary center may be arranged on a mount opening side. Furthermore, in the present embodiment, the half mirror has a reflectance of 30% and a transmittance of 70%, but the present invention is not limited to these ratios, and the ratios can appropriately be changed.

The distance measurement/light-metering sensor 217 forming a part of a focal detecting section and a subject luminance detecting section is arranged at a position where the luminous flux reflected by the mirror member 201 is guided in the bottom part of the mirror box of the camera main body 20. This distance measurement/light-metering sensor 217 includes a sensor for distance measurement and a light-metering sensor. The light-metering sensor includes a multi-point light-metering device which divides and measures a subject image. The distance measurement sensor is a sensor which performs the distance measurement by a TTL phase difference detection system. An output of the distance measurement/light-metering sensor 217 is sent to a distance measurement/light-metering processing circuit 219. The distance measurement/light-metering processing circuit 219 outputs an evaluated light-metering value based on the output of the light-metering sensor, and measures an out-of-focus amount of the subject image formed by the lenses 101a, 101b based on an output of the distance measurement sensor. It is to be noted that the distance measurement sensor and the light-metering sensor may separately or integrally be constituted.

A focal plane type of light interrupting shutter 203 for exposure time control and the CCD 221 is arranged behind the mirror member 201 along an optical axis of the lenses 101a, 101b and a photographing optical path. This shutter 203 is controlled by a shutter driving mechanism 213. A dustproof filter 205 is arranged behind the shutter 203. It is prevented by this filter that dust generated at the mount opening of the camera main body 20 and in the main body is attached to the CCD 221 and optical elements and that shadows of the dust are appeared in the subject image to form the visually undesirable image.

A piezoelectric element 207 is secured to all or a part of a peripheral edge portion of the dustproof filter 205, and this piezoelectric element 207 is connected to a dustproof filter driving circuit 211, and driven by this circuit. The piezoelectric element 207 is driven by the dustproof filter driving circuit 211 so that the dustproof filter 205 vibrates at a predetermined ultrasonic wave, and the dust attached to a front surface of the dustproof filter 205 is removed by use of the vibration. It is to be noted that the present invention is not limited to the use of ultrasonic vibration as in the present embodiment, as long as the dust attached to an image pickup device such as the CCD itself or an optical element disposed at a front surface of the image pickup device can be removed. This method may appropriately be replaced with various methods such as a method of blowing the dust with an air current by use of a pneumatic pump or the like and a method of collecting the dust by use of static electricity to remove the dust.

An infrared cutting filter 209 for cutting an infrared ray component from the subject luminous flux is arranged behind the dustproof filter 205. An optical low pass filter 210 for removing a high frequency component from the subject luminous flux is arranged behind the filter. Moreover, the CCD 221 is arranged as an image pickup section behind the optical low pass filter 210, and a subject image formed by the lenses 101a, 101b is photoelectrically converted into an electric signal. The dustproof filter 205, the infrared cutting filter 209, the optical low pass filter 210 and the CCD 221 are integrally stored in a hermetically sealed package (not shown), and the dust does not invade this package. It is to be noted that in the present embodiment, the CCD is used as an image pickup device, but the present invention is not limited to this embodiment, and a two-dimensional image pickup device such as a complementary metal oxide semiconductor (CMOS) may be used.

The CCD 221 is connected to an image pickup device driving circuit 223, and driven in response to a control signal from an input/output circuit 239. A photoelectrically analog signal output from the CCD 221 is amplified by the image pickup device driving circuit 223, and analog-digital converted (AD converted). The image pickup device driving circuit 223 is connected to an image processing circuit 227 which functions as an image processing section of an application specific integrated circuit (ASIC) 262. This image processing circuit 227 subjects digital image data to various types of image processing such as digital amplification (digital gain regulation processing), color correction, gamma (γ) correction, contrast correction, monochromatic/color mode processing, live view display processing and processing of a movie image to be recorded in the recording medium. It is to be noted that the CCD 221 together with the movie image processing function of the image processing circuit 227 will be referred to as a movie image output section.

The image processing circuit 227 is connected to a data bus 261. This data bus 261 is connected to the image processing circuit 227, and additionally connected to a sequence controller (hereinafter referred to as the "body CPU") 229, a compression and extension circuit 231, a video signal output circuit 233, an SDRAM control circuit 237, the input/output circuit 239, a communication circuit 241, a recording medium control circuit 243, a flash memory control circuit 247 and a switch detection circuit 253.

The body CPU 229 controls an operation of this digital camera. The compression and extension circuit 231 is a circuit for compressing the image data stored in an SDRAM 238 using a compression system such as JPEG or MJPEG for the still image or the movie image. It is to be noted that the image compression system is not limited to the JPEG and the MJPEG, and another compression method is applicable. The video signal output circuit 233 is connected to a back surface liquid crystal monitor 26 and a finder liquid crystal monitor 29 (abbreviated as the F liquid crystal monitor in the drawing) via a liquid crystal monitor driving circuit 235. The video signal output circuit 233 is a circuit for converting the image data recorded in the SDRAM 238 or a recording medium 245 into a video signal to be displayed in the back surface liquid crystal monitor 26 and/or the finder liquid crystal monitor 29.

The back surface liquid crystal monitor 26 is arranged at a back surface of the camera main body 20, but may be arranged at a position other than the back surface of the camera main body as long as a camera user can observe the monitor at the position. The back surface monitor is not limited to a liquid crystal, and another display device may be used. The finder liquid crystal monitor 29 is arranged at a position which can be observed by the camera user via a finder eyepiece section. The finder monitor is not limited to a liquid crystal, and another display device may be used in the same manner as in the back surface liquid crystal monitor 26. It is to be noted that the subject image can be observed in the only back surface liquid crystal monitor 26, and the finder eyepiece section and the finder liquid crystal monitor 29 can be omitted.

The SDRAM 238 is connected to the data bus 261 via the SDRAM control circuit 237. This SDRAM 238 is a buffer memory for temporarily storing the image data subjected to image processing by the image processing circuit 227 or the image data compressed by the compression and extension circuit 231. The input/output circuit 239 connected to the dustproof filter driving circuit 211, the shutter driving mechanism 213, the movable mirror driving mechanism 215, the distance measurement/light-metering processing circuit 219 and the image pickup device driving circuit 223 controls each circuit such as the body CPU 229 and controls input/output of the data via the data bus 261. The communication circuit 241 connected to the lens CPU 111 via the communication contact 300 exchanges the data with the body CPU 229 or the like and transmits a control command via the data bus 261.

The recording medium control circuit 243 is connected to the recording medium 245, and controls recording of the image data and the like in this recording medium 245. The recording medium 245 is a card-like medium in which a rewritable memory element is incorporated, and is detachably attached to the camera main body 20. In addition, a hard disk unit and a radio communication unit may be connected to the circuit.

The flash memory control circuit 247 is connected to a flash memory 249. In this flash memory 249, a program for controlling a flow of the camera is stored. The body CPU 229 controls the digital camera according to the program stored in this flash memory 249. It is to be noted that the flash memory 249 is an electrically rewritable nonvolatile memory.

A power switch 257 which turns on/off in cooperation with a power switch lever to control power supply to the camera main body 20 and the lens barrel 10, the attachment/detachment detection switch 259 and various other switches 255 are connected to the data bus 261 via the switch detection circuit 253. The various other switches 255 include a switch which cooperates with a shutter release button, a switch which cooperates with a reproduction button to instruct a reproduction mode, a switch which cooperates with a cross button to instruct movement of a cursor in a screen of the back surface liquid crystal monitor 26, a switch which cooperates with a mode dial to instruct a photography mode, an OK switch which cooperates with an OK button to determine each selected mode and the like.

It is to be noted that the release button includes a first release switch which turns on, when the camera user half presses the release button, and a second release switch which turns on, when the camera user fully presses the release button. When this first release switch (hereinafter referred to as 1R) turns on, the camera performs photography preparing operations such as focal detection, focusing of the photographing lens and light metering of subject luminance. When the second release switch (hereinafter referred to as 2R) turns on, the camera executes a photography operation to take in the image data of the subject image based on the output of the CCD 221 as the image pickup device.

It is to be noted that it can be constituted such that the CCD 221 and the distance measurement/light-metering sensor 217 are reversely arranged, the luminous flux reflected by the mirror member 201 is guided to the CCD 221 and the transmitted luminous flux is guided to the distance measurement/light-metering sensor 217.

Figure 2:
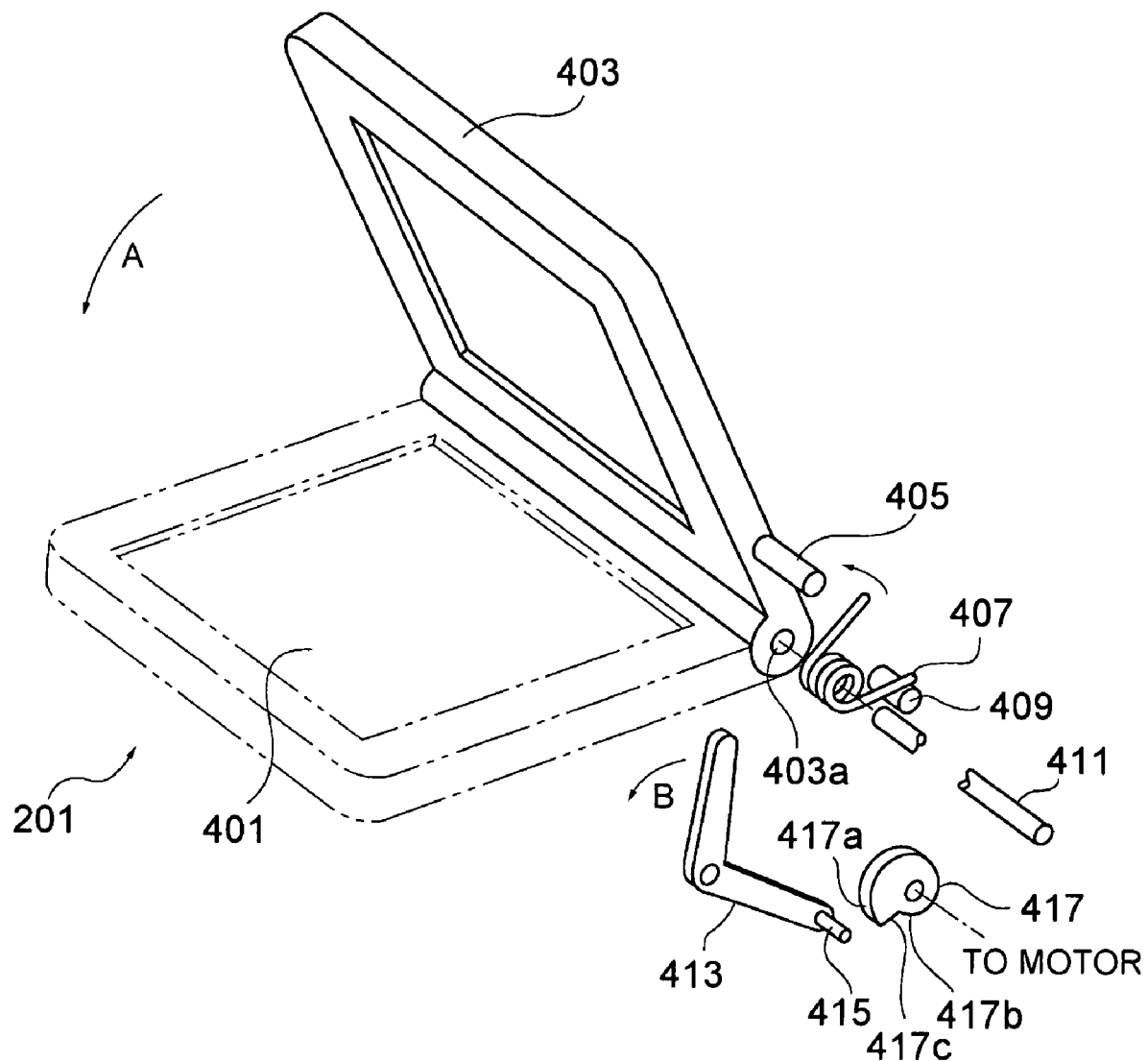
FIG. 2 is an exploded perspective view showing a structure of a movable mirror member according to one embodiment to which the present invention is applied.
Figure 3:
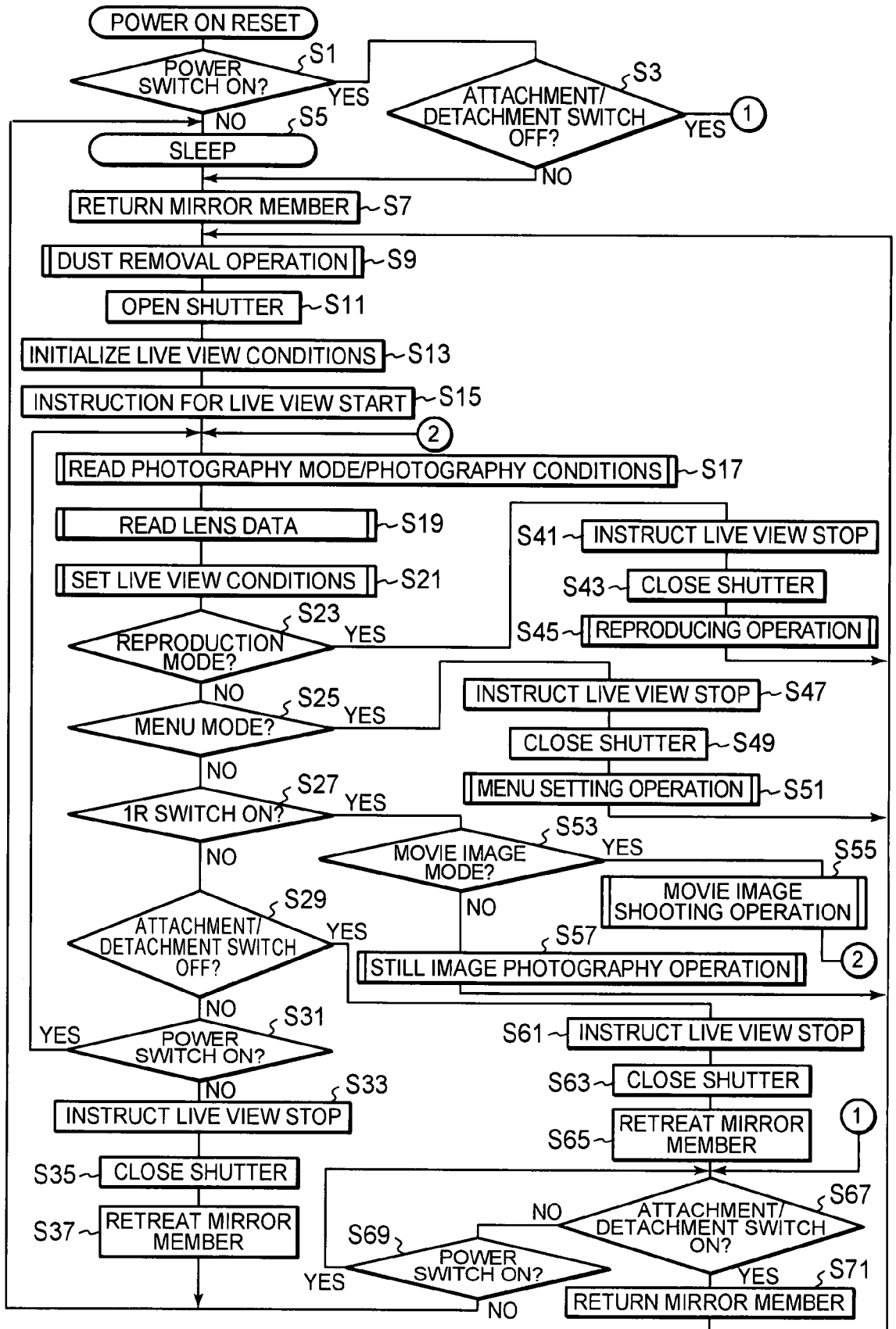
FIG. 3 is a flow chart showing a power-on reset operation according to one embodiment of the present invention.

Next, a driving mechanism stage and retreating mechanism of the mirror member 201 will be described with reference to FIG. 2. A half mirror 401 which transmits a part of the subject luminous flux and reflects a part of the flux is held by a mirror frame 403. This mirror frame 403 is rotatable around a shaft 411 inserted into a hole 403a, and the rotary shaft 201a of FIG. 1 is the central axis of the shaft 411. Opposite ends of an open spring 407 engage with a pin 409 fixed to the camera main body 20 and a driving pin 405 planted at the mirror frame 403, and a coil portion of this open spring 407 is wound around the shaft 411. A spring force of this open spring 407 urges the mirror frame 403 in a counterclockwise direction (an arrow-A direction) in the drawing. The driving pin 405 engages with one end of an engagement lever 413, and a cam pin 415 planted at the other end of this engagement lever 413 engages with a cam 417 for the mirror.

The engagement lever 413 is supported on the mirror box (not shown) at a rotary center thereof, and is urged in a counterclockwise direction (an arrow-B direction) with a spring force of the open spring 407 via the driving pin 405. Therefore, the cam pin 415 of the engagement lever 413 comes in contact with a cam surface of the cam 417 for the mirror under pressure. The cam surface of the cam 417 for the mirror is formed so that a length of the cam from the rotary center in a radial direction changes. That is, a distance from the rotary center is increased at an engagement position 417a of the cam surface, and a distance from the rotary center is reduced at an engagement release position 417b as compared with the engagement position 417a. Moreover, the cam surface is formed with a stepped portion 417c from the engagement position 417a to the engagement release position 417b in the counterclockwise direction in the drawing, and the cam surface is formed so as to be smoothly displaced from the engagement release position 417b to the engagement position 417a.

When the engagement position 417a of the cam 417 for the mirror is disposed at such a position as to abut on the cam pin 415, rotation of the engagement lever 413 in the arrow-B direction is regulated by the cam 417 for the mirror. Therefore, the mirror frame 403 is held at a reflecting position. From this state, the cam 417 for the mirror is rotated clockwise in the drawing to reach the engagement release position 417b through the stepped portion 417c and to abut on the cam pin 415. The rotation of the engagement lever 413 in the arrow-B direction can be realized. Therefore, the mirror frame 403 rotates in the arrow-A direction and is displaced to a retreated position owing to an urging force of the open spring 407. It is to be noted that the cam 417 for the mirror is driven and rotated by a motor (not shown).

Such a driving mechanism which drives the mirror member 201 to the reflecting position (a position shown by a solid line in FIG. 2) in the photographing optical path includes the cam 417 for the mirror, the engagement lever 413 and the like. A retreating mechanism which drives the mirror member 201 to the retreated position (a position shown by a two-dot chain line in FIG. 2) outside the photographing optical path includes the open spring 407. It is to be noted that the driving mechanism and the retreating mechanism are not limited to these constitutions, and other constitutions can be used as long as the mirror member 201 can be driven.

The mirror member 201 is constituted in this manner. Therefore, when the cam pin 415 is driven to come in contact with the engagement release position 417b by the motor (not shown), the mirror frame 403 and the engagement lever 413 rotate in the arrow-B direction owing to the urging force of the open spring 407. The mirror frame 403 is disposed at the retreated position as shown by the two-dot chain line in the drawing. In this state, the cam 417 for the mirror is rotated by the motor to reach a position where the cam pin 415 comes in contact with the engagement position 417a. In this case, the engagement lever 413 is rotated in a clockwise direction (a direction reverse to the arrow-B direction), and the mirror frame 403 is rotated in the clockwise direction (a direction reverse to the arrow-A direction) via the driving pin 405 against the urging force of the open spring 407 and is positioned at the reflecting position as shown by a solid line in the drawing.

Next, an operation of the digital camera according to one embodiment of the present invention will be described with reference to flow charts of FIGS. 3 to 6. When entering a power on reset flow shown in FIG. 3, it is judged whether or not the power switch 257 of the camera main body 20 turns on (S1). As a result, in a case where it is judged that the power switch 257 turns off, the flow advances to step S5, and a sleep state as a state of low consumption power results. In this sleep state, interruption processing is performed in an only case where the power switch 257 turns on. In step S7 and subsequent steps, processes ought to be done during the on-state of the power switch are performed. An operation other than the power switch interruption processing is prohibited until the power switch turns on. In consequence, waste of the energy in a power cell is prevented.

In a case where it is judged in the step S1 that the power switch 257 turns on, the flow advances to step S3 to judge whether or not the attachment/detachment detection switch 259 turns off. As described above, the attachment/detachment detection switch 259 turns off, when the lens barrel 10 is detached from the camera main body 20. When the switch turns off, that is, when the lens barrel 10 is detached, the flow advances to step S67 described later. This is because, in a case where the power switch lever of the camera main body 20 is operated to turn on the power switch in a state in which the lens barrel 10 is detached, processing similar to the processing at a time when the lens is detached is performed. In a case where it is judged in the step S3 that the attachment/detachment detection switch 259 turns on, the flow advances to the step S7 and the subsequent steps, the processing at a time when the power switch turns on is performed.

In the step S7, the mirror member 201 is returned to the reflection position. Since when the power switch 257 turned off, the mirror member 201 had been retreated from the photographing optical path (a state of a two-dot chain line in FIG. 1), but at present the power switch 257 turns on, so the subject luminous flux from the lens barrel 10 should be guided to the distance measurement/light-metering sensor 217, and light-metering and distance measurement should be performed if necessary. In step S9, the dustproof filter 205 performs a dust removal operation. This is an operation of applying a driving voltage from the dustproof filter driving circuit 211 to the piezoelectric element 207 secured to the dustproof filter 205 to remove the dust and the like owing to the ultrasonic vibration as described above. Subsequently, the shutter driving mechanism 213 performs an operation of opening the shutter 203 (S11).

In consequence, since the subject luminous flux transmitted through the mirror member 201 is not interrupted by the shutter 203, the subject image is formed on the CCD 221. To start live view display in which the subject image is displayed as a movie image in the back surface liquid crystal monitor 26 by use of the data of the image picked up by this CCD 221, live view conditions are initialized (S13). To initialize the live view conditions, an electronic shutter speed TV of the CCD 221 and a default value of an ISO sensitivity SV are set. A frame rate at which the live view is displayed is also set (to 30 fps in the present embodiment). Here, to display a live view in the back surface liquid crystal monitor 26 or the like in accordance with the set frame rate, reading at the CCD 221 and processing at the image processing circuit 227, the video signal output circuit 233, the liquid crystal monitor driving circuit 235 and the like are performed. Since preparations for the live view display are completed in this manner, live view start is instructed (S15). It is to be noted that, on receiving this start instruction, the image processing circuit 227 controls the live view display operation. At this time, the aperture value of the aperture 103 is set to the open aperture value.

Next, photography conditions for a photography mode to shoot the still image or the movie image, for example, a program photography mode or the like set with a mode dial or the like (not shown) and information such as the ISO sensitivity and manually set shutter speed and aperture value are read if any (S17). Moreover, communication with the lens CPU 111 is performed to read various lens data such as a set focal length of the photographing lens of the lens barrel 10, a wide-angle-end focal length, a telephoto-end focal length, a presently set focal position, the shortest distance of a subject capable to be imaged and open aperture value (S19).

Subsequently, the image data of the movie image can be acquired with an exposure value EV as a targeted correct exposure amount, and live view conditions are set in order to display an image having an appropriate brightness (brightness of color) in the back surface liquid crystal monitor 26 and/or the finder liquid crystal monitor 29 (S21). In this step, conditions of the electronic shutter speed TV and the ISO sensitivity SV are set to drive the CCD 221. First in the step S13, the electronic shutter speed TV and the ISO sensitivity SV are regulated by use of the value initialized in the step S13 so as to obtain targeted image brightness. Details will be described later with reference to a flow chart of FIG. 4.

Subsequently, the flow advances to step S23 to judge whether or not the mode is a reproduction (i.e., playback) mode. In this reproduction mode, when a reproduction button is operated, the image data recorded in the recording medium 245 is read and displayed in the back surface liquid crystal monitor 26 and/or the finder liquid crystal monitor 29. As a result, in a case where it is judged that the reproduction mode is set, the flow advances to step S41, and the image processing circuit 227 is instructed to stop the live view display. Subsequently, the shutter 203 is closed (S43). Moreover, the image data recorded in the recording medium 245 is read, the image data is extended in the compression and extension circuit 231, and the still image or the movie image is reproduced and displayed in the back surface liquid crystal monitor 26 and/or the finder liquid crystal monitor 29 via the video signal output circuit 233 and the liquid crystal monitor driving circuit 235 (S45). In a case where another manual operation such as half pressing of the release button is performed during the reproducing operation, the reproducing operation is terminated to return to the step S9, thereby repeating the above-mentioned operation.

In a case where it is judged in the step S23 that the reproduction mode is not set, the flow advances to step S25 to judge whether or not a menu mode is set. It is judged whether or not a menu button is operated to set the menu mode. As a result, in a case where it is judged that the menu mode is set, in the same manner as in a case where the reproduction mode is set, an instruction to stop the live view display is output (S47), and an instruction to close the shutter 203 is output (S49). Subsequently, an operation for setting a menu is performed (S51). In the setting of the menu, various parameters such as white balance, ISO sensitivity and a driving mode can be set. When the menu setting operation ends, the flow returns to the step S9 to repeat the above-mentioned operation.

As a result, in a case where it is judged in the step S25 that the menu mode is not set, the flow advances to step S27 to judge whether or not the release button is half pressed, that is, the 1R switch turns on. As a result, in a case where it is judged that the 1R switch turns on, the flow advances to step S53 to judge whether or not the photography mode read in the step S17 is a movie image mode. As a result, in a case where it is judged that the mode is the movie image mode, the flow advances to step S55 to execute a sub-routine of the movie image shooting operation. When the mode is not the movie image mode, that is, when the mode is the still image mode, the flow advances to step S57 to execute a sub-routine of a still image shooting operation. Details of the sub-routine of the movie image shooting operation will be described later with reference to FIG. 5. When the sub-routine of the movie image shooting operation ends, the flow returns to the step S17. When the sub-routine of the still image shooting operation ends, the flow returns to the step S9, thereby repeating the above-mentioned steps.

As a result, in a case where it is judged in the step S27 that the 1R switch turns off, the flow advances to step S29 to judge whether or not the attachment/detachment detection switch 259 turns off in the same manner as in the step S3. When the lens barrel 10 is detached, in the same manner as in the steps S41 and S43 of the reproduction mode, an instruction to stop the live view display is output (S61), and the shutter 203 is closed (S63). Subsequently, the mirror member 201 is retreated (S65). As described above, the retreating operation is performed by driving the motor to rotate the cam 417 for the mirror, and rotating the mirror frame 403 to the position retreated from the photographing optical path with the urging force of the open spring 407 (the position of the two-dot chain line in FIGS. 1 and 2).

In a case where the retreating operation of the mirror member 201 ends, or a case where it is judged in the step S3 that the attachment/detachment detection switch 259 turns off (i.e., a case where the lens barrel 10 is detached), the flow advances to the step S67 to judge whether or not the attachment/detachment detection switch 259 turns on. After it is detected in the step S29 that the lens barrel 10 is detached, it is judged whether or not the lens barrel 10 is attached again. As a result, in a case where it is judged that the lens barrel 10 is attached, the flow advances to step S71 to return the mirror member 201. As described above, the motor is driven to rotate the cam 417 for the mirror, the engagement lever 413 is rotated by the cam surface in the clockwise direction against the urging force of the open spring 407, and the mirror frame 403 is inserted into the optical path of the lenses 101a, 101b. When the mirror member 201 completes returning, the flow returns to the step S9, thereby repeating the above steps.

In a case where it is judged in the step S67 that the attachment/detachment detection switch 259 turns off, the flow advances to step S69 to judge whether or not the power switch 257 turns on. In a case where the lens barrel 10 is detached and the power switch 257 turns on, even when various operation buttons are operated, the mount opening remains to be open. Therefore, from a viewpoint of prevention of a malfunction, any camera operation is not performed. Therefore, the camera is brought into a standby state in which it is repeatedly judged in the step S67 whether or not the lens barrel 10 is attached and it is repeatedly judged in the step S69 whether or not the power switch lever is operated. In a case where it is judged in the step S67 that the power switch 257 turns off, the flow returns to the step S5 to bring the camera into the sleep state. Various modifications of the above operation are possible. For example, if it is detected in the step S67 that the lens barrel 10 remains to be detached, the judgment of the step S69 can be omitted, and the flow can advance to the step S5 to bring the camera into the sleep state. Or, the flow can advance to the step S9 to perform an operation based on the operations of various operation buttons.

As a result, in a case where it is judged in the step S29 that the attachment/detachment detection switch 259 turns on, that is, the lens barrel 10 is attached to the camera main body, the flow advances to step S31 to judge whether or not the power switch 257 turns on. As a result, in a case where it is judged that the switch turns on, the flow returns to the step S17 to repeat the above-mentioned step.

After the live view display is started in the step S15, the subject luminous flux transmitted through the mirror member 201 is not hampered by the shutter 203 as long as various operation buttons and the like are not operated in the step S23 and the subsequent steps. Therefore, the subject image is formed on the CCD 221, and the image data picked up by this CCD 221 is live-view displayed as the movie image in the back surface liquid crystal monitor 26 and/or the finder liquid crystal monitor 29.

In a case where it is judged in the step S31 that the power switch 257 turns off, in the same manner as in the step S41, S43, the image processing circuit 227 is instructed to stop the live view display (S33), and the shutter 203 is closed (S35). Subsequently, in the same manner as in the step S65, after the mirror member 201 is retreated (S37), the flow returns to the step S5 in the sleep state.

Figure 4:
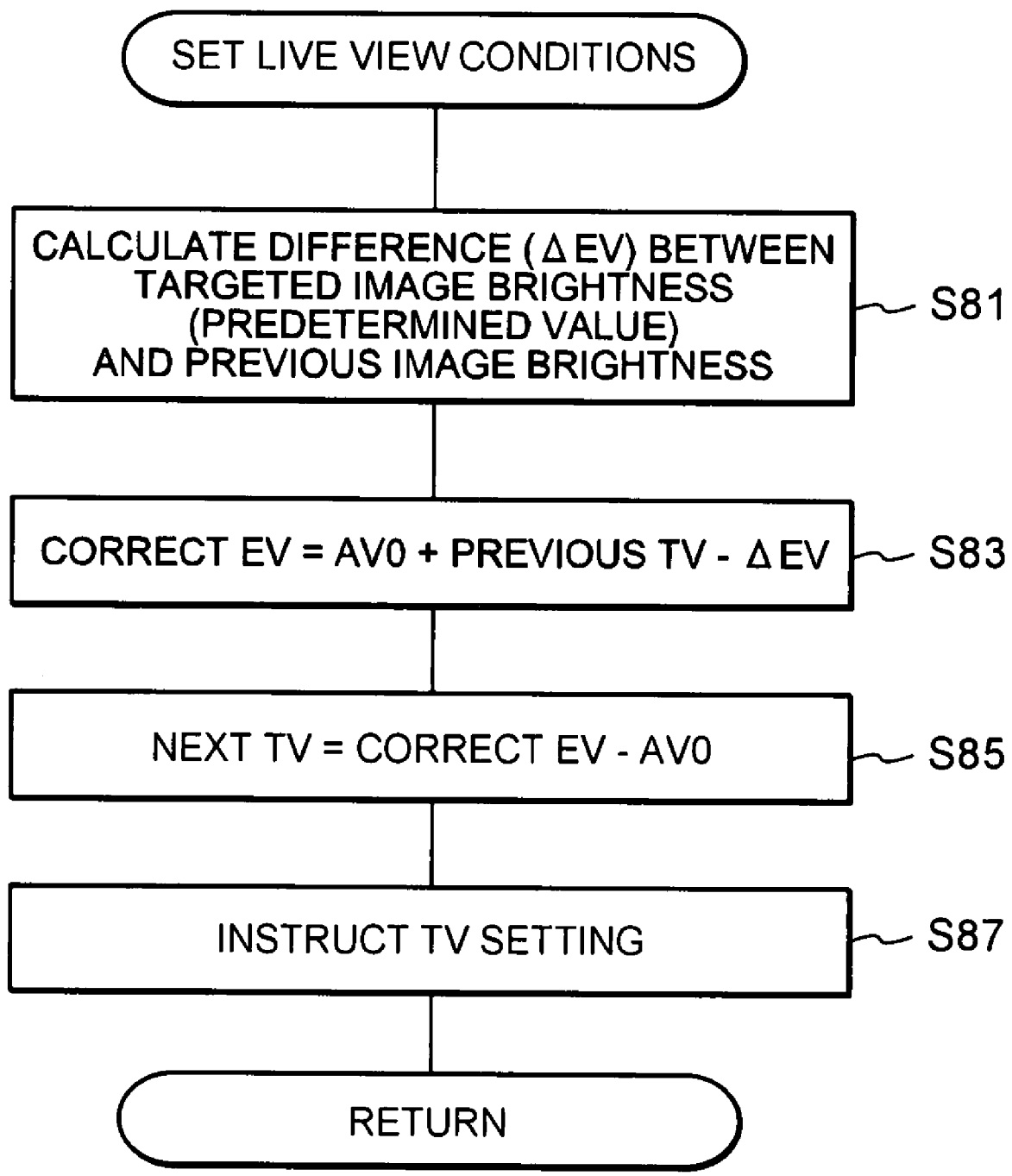
FIG. 4 is a flow chart showing an operation of setting live view conditions according to one embodiment of the present invention.

Next, a sub-routine of the setting of the live view conditions in the step S21 will be described with reference to FIG. 4. When the flow enters the sub-routine of the setting of the live view conditions, first a difference ΔEV between targeted image brightness (a predetermined value) and image brightness during the previous photography is calculated (S81). This is a difference ΔEV between the exposure value EV (here EV=TV−SV (TV is an apex value of the electronic shutter speed, SV is an apex value corresponding to the ISO sensitivity)) equal to the targeted image brightness in the back surface liquid crystal monitor 26 or the like and the EV value during the previous display in the back surface liquid crystal monitor 26.

Subsequently, a correct EV value is obtained from a calculation formula AV0+the previous TV−ΔEV by use of an open aperture value AV0, the electronic shutter speed TV and the difference ΔEV of the image brightness obtained in the step S81. Here, a reason why the correct EV value is calculated by use of the open aperture value AV0 is that the aperture 103 is set to the open aperture value during the live view display. Subsequently to this calculation, the next electronic shutter speed (the next TV value) is obtained from a calculation formula of the correct EV−AV0 by use of the correct EV value obtained in the step S83 and the open aperture value AV0 (S85). Here, an instruction is output to the image pickup device driving circuit 223 so as to control the CCD 221 with the obtained next TV value (S87). As described above, in the present sub-routine, the electronic shutter speed TV is changed in accordance with the difference (ΔEV) between the targeted image brightness and the previous image brightness to constantly regulate the image brightness to be constant. In a case where the calculated value of the next TV exceeds a set range, both of the electronic shutter speed TV and the ISO sensitivity SV may be controlled.

Figure 5:
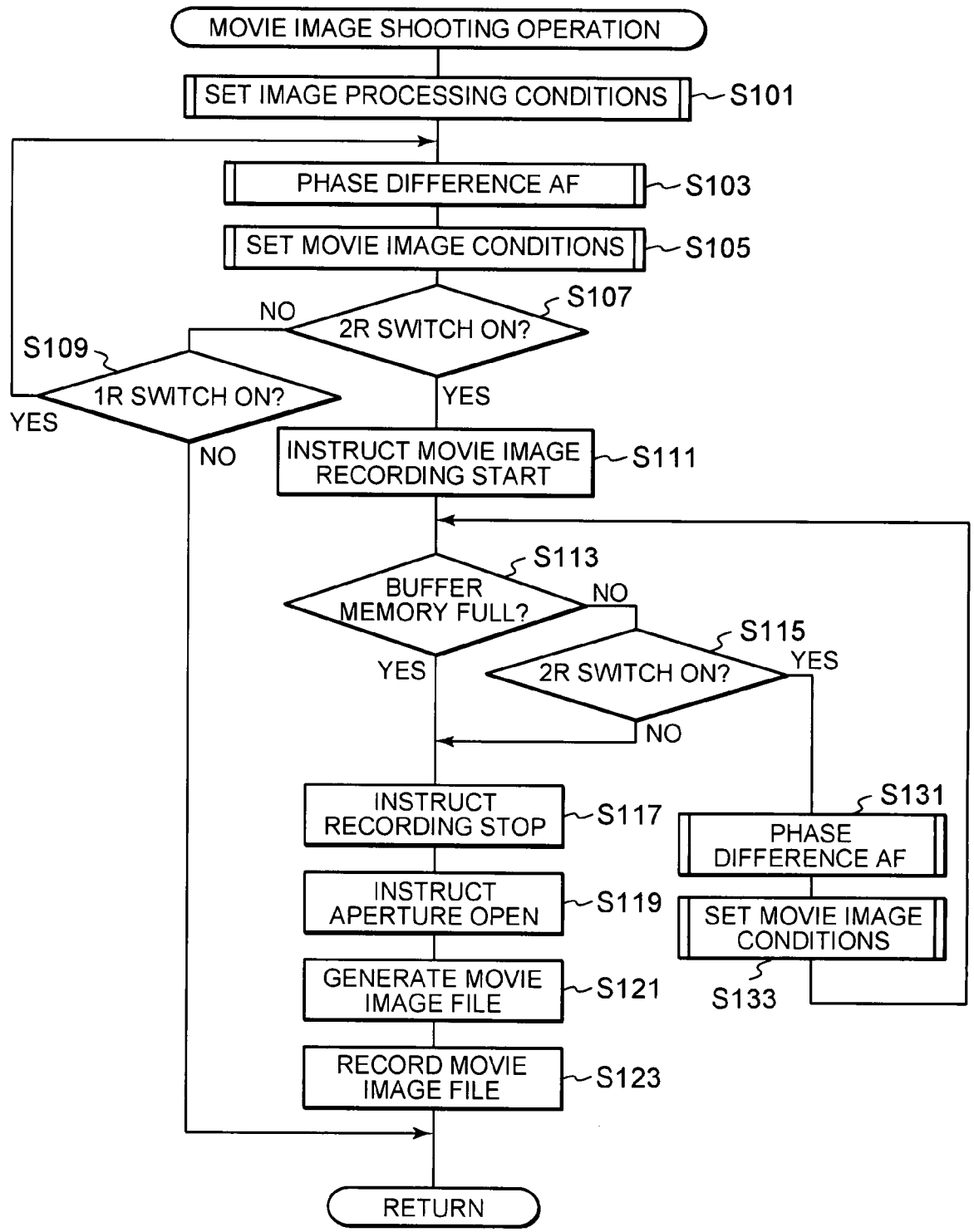
FIG. 5 is a flow chart of a movie image shooting operation according to one embodiment of the present invention.

Next, a sub-routine of the movie image shooting operation in the step S55 will be described with reference to FIG. 5. As described above, this sub-routine is executed, when the movie image shooting mode is selected and the release button is half pressed. First, image processing conditions are set (S101). In consequence, the image processing circuit 227, the compression and extension circuit 231 and the like are instructed to select the movie image mode. Moreover, an image size, a compression ratio and the like are also indicated. Therefore, the image processing circuit 227 performs image processing suitable for the movie image, and the compression and extension circuit 231 appropriately compresses the movie image.

Subsequently, a sub-routine of phase difference AF is executed as functions of the focal detecting section and a part of a focal adjustment section (S103). In this sub-routine of the phase difference AF, an adjustable distance measurement operation is performed, and the photographing lens is driven at a focal position based on a result of this distance measurement. In the distance measurement, the distance measurement sensor of the distance measurement/light-metering sensor 217 receives the subject luminous flux reflected by the mirror member 201. By use of an output of this distance measurement sensor, the distance measurement/light-metering processing circuit 219, the body CPU 229 and the like detect an out-of-focus direction and an out-of-focus amount of the lenses 101a, 101b by a TTL phase difference detection process. Moreover, the body CPU 229 drives the lenses 101a, 101b to the focal position by the optical driving mechanism 107 via the lens CPU 111 based on the detected out-of-focus direction and out-of-focus amount.

When operation of the phase difference AF including the distance measurement and focal driving are completed, movie image conditions are set. The electronic shutter speed TV and the aperture value AV are set so as to obtain the targeted exposure value EV. The aperture value AV is set to such an aperture value that necessary distance measurement precision can be secured in the phase difference AF. This setting of the movie image conditions will be described later with reference to FIG. 6. When the setting of the movie image conditions is competed, it is then judged whether or not the release button is fully pressed, that is, whether or not the switch 2R turns on (S107). As a result, in a case where it is judged that the switch turns off, the flow advances to step S109 to judge whether or not the switch 1R turns on. When the flow had jumped to this sub-routine of the movie image shooting operation with the release button half pressed and the release button still remains to be half pressed, a loop of the steps S103 to S109 is performed and the judgment is repeatedly performed in the standby state. In this case, the phase difference AF and the setting of the movie image conditions are performed. Therefore, even when the release button remains to be half pressed and the camera is directed to another subject having different subject luminance, screen brightness is regulated to be constant in the back surface liquid crystal monitor 26 or the like. Moreover, the phase difference AF is repeatedly performed. Therefore, even when framing is changed and the subject is moved, the focusing is automatically performed. When the release button is released to turn off the switch 1R, the flow returns from the step S109 to the step S9 of the power-on reset routine.

In a case where it is judged in the step S107 that the switch 2R turns on, that is, a case where the release button is fully pressed, the flow advances to an image pickup operation to acquire the movie image. The flow advances to step S111 to give an instruction to start recording of the movie image. When the recording of the movie image is started, the CCD 221 picks up the image at the set electronic shutter speed TV, a subject image signal output from the CCD 221 is processed by the image processing circuit 227, the image is compressed by the compression and extension circuit 231 in the JPEG system fro each frame, and this processed image data is stored in the SDRAM 238.

Subsequently, the flow advances to step S113 to judge whether or not a storage capacity of the SDRAM 238 for use as a buffer memory is full. As a result, in a case where it is judged that the capacity is not full, the flow advances to step S115 to judge whether or not the switch 2R turns on, that is, whether or not the camera user fully presses the release button to continue the movie image shooting. As a result, in a case where it is judged that the switch 2R turns on, the flow advances to step S131 to perform the phase difference AF in the same manner as in the step S103. The obtained out-of-focus direction and out-of-focus amount are output to the lens CPU 111, and the lenses are driven only once by the optical driving mechanism 107. When the sub-routine of the phase difference AF ends, the movie image conditions are then set in the same manner as in the step S105 (S133). While the movie image is recorded, the subject luminance or the like changes in some case. Even in this case, the electronic shutter speed TV and the aperture value AV are regulated so as to perform correct exposure. When the setting of the movie image conditions ends, the flow returns to the step S113 to repeat these steps.

In a case where it is judged in the steps S113 and S115 that the SDRAM 238 in which the image data is recorded has a full storage capacity or the switch 2R turns off, that is, the camera user releases the release button to stop the photography, the flow advances to step S117 to instruct stopping of recording. Subsequently, an instruction to fully open the aperture is sent to the lens CPU 111 to bring the aperture 103 into the open state (step S119). Subsequently, a movie image file of a motion JPEG (MJPEG) form for the movie image is generated based on the image data of a JPEG form for each frame stored in the SDRAM 238 (S121). This generated movie image file is recorded in the recording medium 245 via the recording medium control circuit 243 (S123). When this recording of the movie image file ends, the flow returns to the step S17 of the power-on reset routine to repeat the above-mentioned steps.

Next, the sub-routine of the setting of the movie image conditions in the steps S105 and S133 will be described with reference to FIG. 6. This sub-routine functions as a setting section which sets the aperture value AV and the electronic shutter speed TV so as to obtain a correct exposure amount, when the movie image is acquired. When the flow enters this routine, first a difference (ΔEV) between the targeted image brightness (the predetermined value) and the brightness of the previous image is calculated (S201). That is, the difference between the value corresponding to EV as the correct exposure amount and the brightness of the image (EV corresponding to the exposure amount) previously displayed in the back surface liquid crystal monitor 26 is calculated. Subsequently, this difference is subtracted from the previous exposure amount (i.e., the previous AV+the previous TV) to obtain the correct exposure amount (the correct EV) (S203).

Subsequently, the next aperture value AV and the electronic shutter speed TV are calculated from the obtained correct EV (S205). Using the relation of EV=AV+TV, AV and TV can be determined so that a value obtained by adding up the aperture value AV and the electronic shutter speed TV becomes the correct EV obtained in the step S203. Subsequently, it is judged whether or not the next AV obtained in the step S205 is smaller than the open aperture value AV0 (an open F-number, e.g., AV0=3), that is, the next AV to be set is a further open aperture value as compared with the open aperture value AV0 (S207).

As a result, in a case where it is judged that the next AV is smaller than the open aperture value AV0, the aperture value cannot be realized. Therefore, the flow advances to step S211 to set the next AV to the open aperture value AV0. On the other hand, as a result, in a case where it is judged that the next AV is larger than the open aperture value AV0, the flow advances to step S209 to compare the next AV with an aperture value AVa (an F-number, e.g., AVa=5) at which the distance can be measured with the phase difference AF. In the phase difference AF mode, triangular distance measurement is performed using two peripheral luminous fluxes transmitted through the photographing lens. Therefore, to perform the phase difference AF, it is judged whether or not the aperture value is larger than the aperture value AVa at which the distance measurement precision can be secured.

Figure 8A:
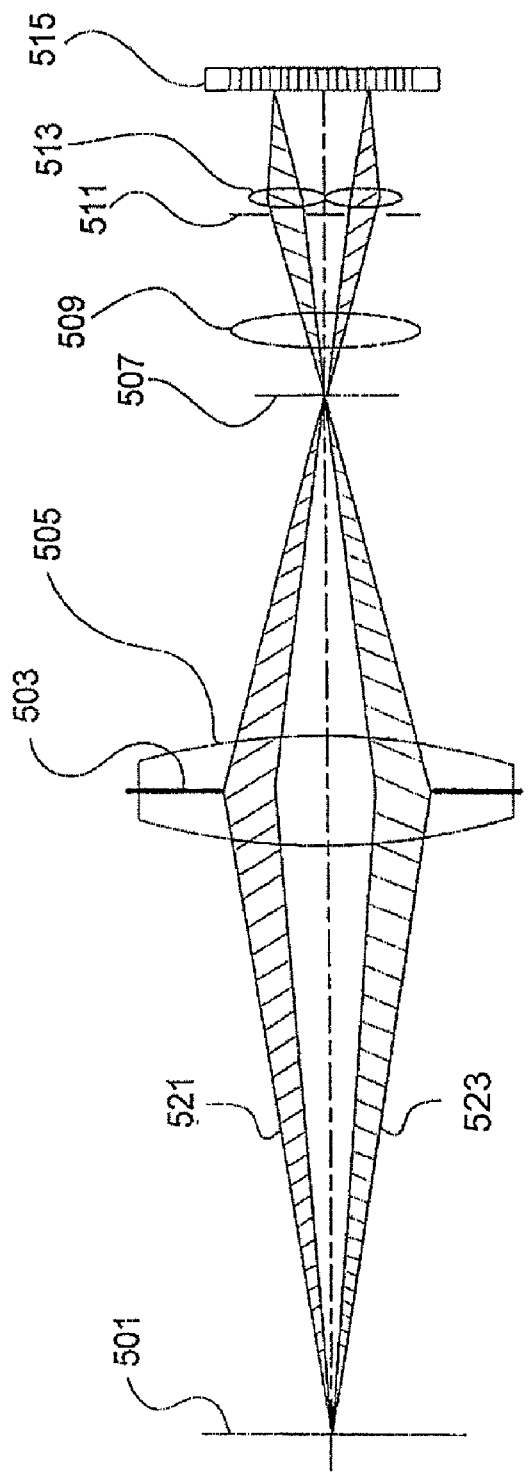
FIG. 8A is a diagram showing a distance measurement principle of phase difference AF in a case where an aperture does not hamper a peripheral luminous flux for use in phase difference distance measurement.
Figure 8B:
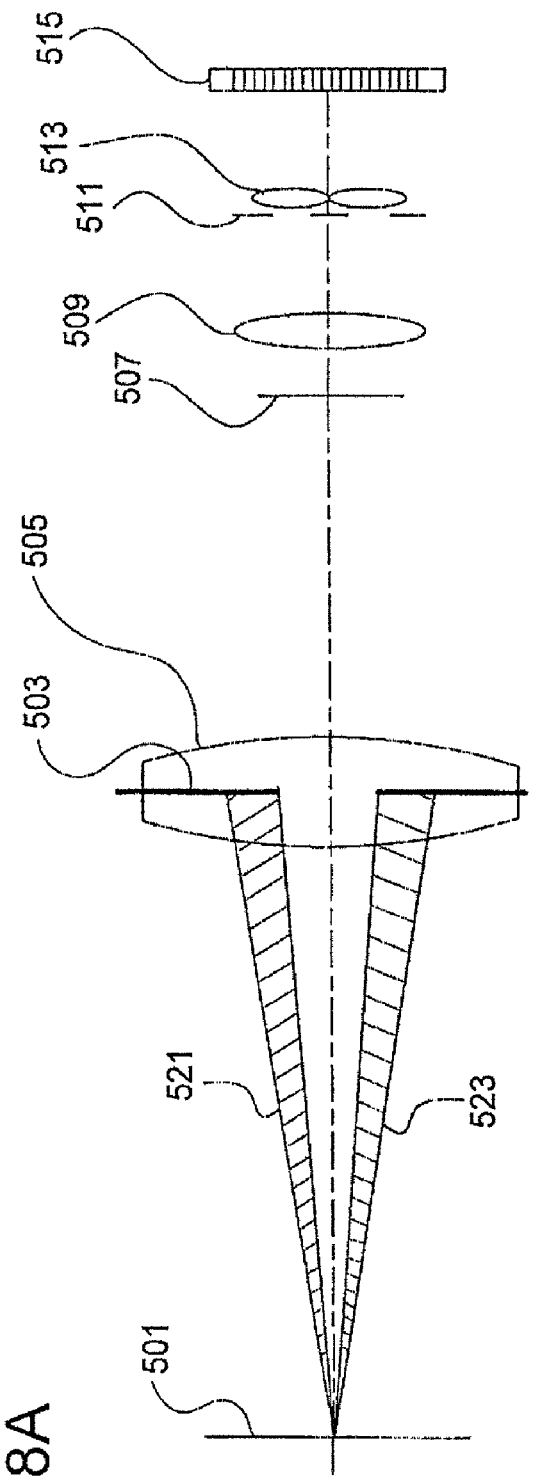
FIG. 8B is a diagram showing a distance measurement principle of phase difference AF in a case where the aperture hampers the peripheral luminous flux.

The distance measurable aperture value AVa will be described with reference to FIGS. 8A and 8B showing a phase difference AF distance measurement principle. Subject light emitted from one point of a subject surface 501 passes through an opening of an aperture 503 arranged in a photographing lens 505 to form an image on an image pickup surface 507. It is to be noted that FIG. 8A shows a focused state of the photographing lens 505. Therefore, the image is formed on one point of the image pickup surface 507. However, when the lens is in out-of-focus state, an imaging point is located before or after the image pickup surface 507. The subject luminous flux which has passed through the image pickup surface 507 is condensed by a condenser lens 509, the luminous flux is separated into two peripheral luminous fluxes 521, 523 by an aperture mask 511 and separator lenses 513, and images are formed again on a light receiving element 515 as a distance measurement sensor. When the distance measurement is performed by the phase difference AF, a space between two images formed on the light receiving element 515 can be obtained to detect the out-of-focus amount and the out-of-focus direction of the photographing lens 505.

In a case where the aperture 503 is narrowed from an open state and an aperture value (e.g., about F5.6) is set to such a critical value that the upper subject luminous flux 521 and the lower subject luminous flux 523 are not interrupted as shown in FIG. 8A, the peripheral luminous fluxes reach the light receiving element 515. In consequence, the phase difference distance measurement can be performed with high precision. However, when the aperture is further narrowed to a position where the upper subject luminous flux 521 and the lower subject luminous flux 523 are interrupted as shown in FIG. 8B, the peripheral luminous fluxes do not reach the light receiving element 515, and the phase difference distance measurement cannot be performed. The distance measurable aperture value AVa is set between the aperture value (the smallest aperture value at which the luminous flux for use in the distance measurement is not interrupted by the aperture 503) of the aperture 503 shown in FIG. 8A and the aperture value (the largest aperture value at which the luminous flux for use in the distance measurement is completely interrupted by the aperture 503) of the aperture 503 shown in FIG. 8B. The distance measurable aperture value AVa is the aperture value at which the distance measurable subject luminous flux reaches the light receiving element 515. For example, the distance measurable aperture value AVa is obtained by limiting the aperture value of FIG. 8A as much as about 0.5 stage.

Returning to the step S209, as a result, in a case where it is judged that the next AV is larger than the distance measurable aperture value AVa, the next AV would be narrowed than the distance measurable aperture value, and the distance measurement precision would not be secured. Therefore, to evade such a result, the flow advances to step S213 to set the next AV to the distance measurable aperture value AVa. In a case where the next AV is changed in this step S213 or S211, the flow then advances to step S215 to obtain the next TV from calculation of the correct EV—the next AV. In this case, since the next TV was obtained in the step S205 but the next AV was changed in the step S213, the next TV is calculated again based on the next changed AV. In the present embodiment, the aperture 103 is controlled with such an aperture value as to keep the precision of the phase difference AF in this manner. In accordance with this control, the electronic shutter of the CCD 221 is controlled at such a shutter speed as to obtain correct exposure. In consequence, while the precision of the phase difference AF is maintained, the correct exposure can be obtained.

In a case where the calculation of the step S215 ends or it is judged in the step S209 that the next AV is smaller than the distance measurable aperture value AVa, the flow advances to the step S217 to indicate the calculated TV value to the image pickup device driving circuit 223. The electronic shutter speed of the CCD 221 is controlled in accordance with this indicated electronic shutter speed TV. Subsequently, in step S219, the obtained next aperture value AV is indicated to the lens CPU 111 to control the aperture 103. When the setting of the AV value ends, the flow returns to the original routine.

It is to be noted that, in the present embodiment, to set the movie image conditions, two values of the electronic shutter speed TV of the CCD 221 and the aperture value AV are adjusted to obtain the correct exposure. However, the present invention is not limited to this embodiment, and the ISO sensitivity SV may be changed. To change the value, when the speed TV is lower than the shutter speed at which the hand shake may cause a blur on an image, the ISO sensitivity may be changed to be higher. Alternatively, needless to say, pixels may be added up (i.e., to converge the outputs of plural pixels into one output). To add up the pixels, outputs of adjacent four, nine or 16 pixels are regarded as an output of one pixel. In consequence, even when the luminance is small, a quantity of light can substantially be increased to achieve the correct exposure.

Figure 7:
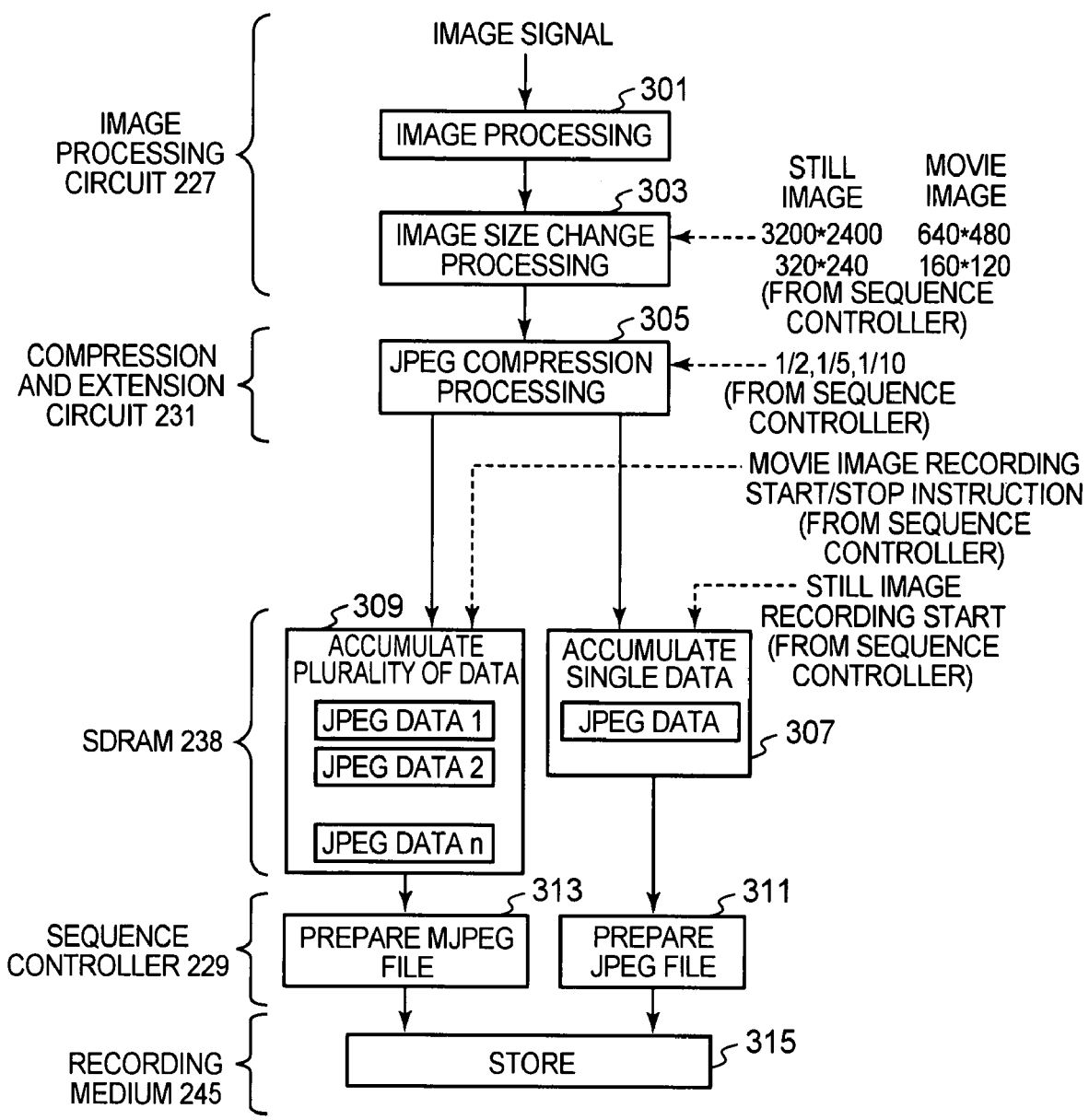
FIG. 7 is a flow chart showing processing of data according to one embodiment of the present invention.

Next, a flow of processing of the data concerning the image in the present invention will be described with reference to FIG. 7. The image signal output from the CCD 221 is subjected to image processing (301) by the image processing circuit 227. Moreover, the image processing circuit 227 performs image size change processing (303) by use of the processed image signal. It is to be noted that the image sizes are set to sizes suitable for the still image and the movie image, respectively.

The image data subjected to the image size change processing is then sent to the compression and extension circuit 231 to perform JPEG compression processing (305). The JPEG compressed image data is stored in the SDRAM 238 to accumulate single data (307), in a case where the shooting of the still image is selected. Moreover, the sequence controller prepares a JPEG file based on the JPEG data stored in the SDRAM 238 (311).

On the other hand, when the shooting of the movie image is selected, in response to the instruction to start the recording of the movie image in the step S111, the image data subjected to the JPEG compression processing (305) is successively stored in the SDRAM 238 (309). Moreover, in response to the instruction to stop the recording of the movie image in the step S117, the storage of the image data of the JPEG form is stopped, and the sequence controller compresses the movie image according to MJPEG as a compression form for the movie image to prepare an MJPEG file (313). Subsequently, when the movie image file is recorded in the step S123, the MJPEG file or the JPEG file is recorded in the recording medium 245.

As described above in detail, in the present embodiment, to perform the distance measurement with the phase difference AF, the aperture value of the photographing lens is set to the aperture value within a distance measurement detectable range. That is, in a case where, in the step S209, the distance measurable aperture value AVa is compared with the next AV and it is judged that the next AV is smaller than the distance measurable aperture value AVa, the distance measurement is performed with the distance measurable aperture value AVa. Therefore, while the high distance measurement precision is secured, the correct exposure can be achieved. As compared with a case where the distance measurement is always performed simply with the open aperture value, it is possible to broaden a range in which the correct exposure can be obtained on a high luminance side.

Moreover, in the present embodiment, the aperture value of the photographing lens is set within the phase difference AF detectable range during the display of the live view and the shooting of the movie image as described above. In consequence, while the distance measurement is performed with high precision and the correct exposure is achieved, the live view can be displayed and the movie image can be recorded.

Figure 6:
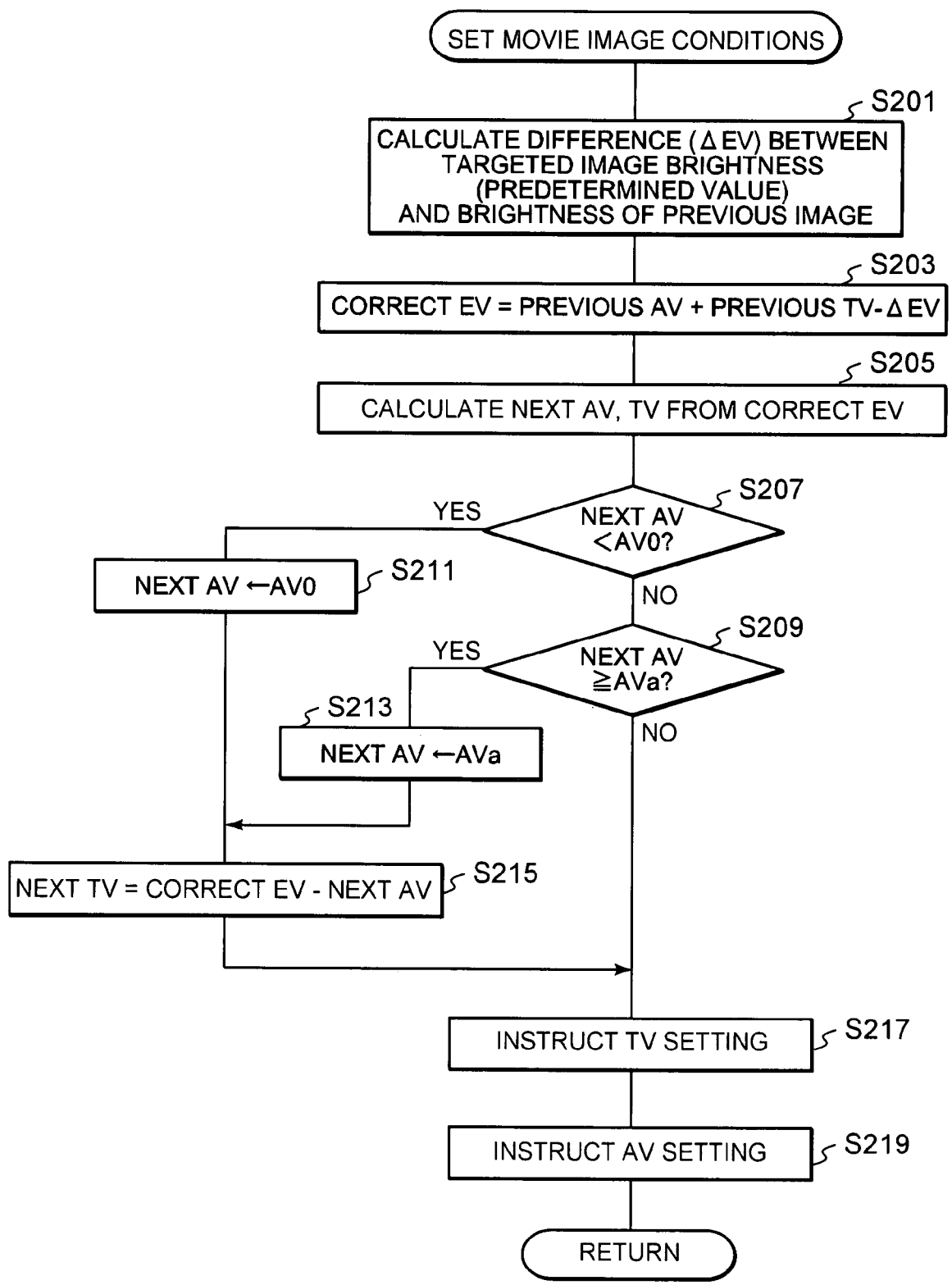
FIG. 6 is a flow chart of setting movie image conditions according to one embodiment of the present invention.

Furthermore, in the present embodiment, when the movie image shooting operation is started, the movie image conditions are set as shown in FIG. 6 as long as the switch 1R turns on, that is, as long as the release button is half pressed. In consequence, the aperture is controlled in the range of the open aperture value AV0 to the distance measurable aperture value AVa. Therefore, in a case where the release button is fully pressed to start the recording of the movie image, the movie image can immediately be recorded with the correct exposure.

In addition, in the present embodiment, when the camera is operated, the mirror member 201 is moved into the photographing optical path, and a part of the subject luminous flux is reflected to the distance measurement/light-metering sensor 217. Therefore, when the release button 21 is half pressed to turn on the switch 1R during the display of the live view, the light metering and the distance measurement can immediately and conveniently be performed in parallel with the display of the live view.

It is to be noted that, in the present embodiment, the CCD 221 as the image pickup device receives the light transmitted through the mirror member 201, and the distance measurement/light-metering sensor 217 receives the reflected light from the mirror member 201. However, conversely, it can be constituted that the CCD 221 receives the reflected light and that the distance measurement/light-metering sensor 217 receives the transmitted light.

Moreover, in the present embodiment, the digital camera can selectively record both of the still image and the movie image. However, the present invention is not limited to this. The digital camera may record only one of the still image and the movie image. In addition, in the present embodiment, in the photography preparing state in which the release button is half pressed, the aperture value is controlled into a range between the open aperture value and the distance measurable aperture value. However, the aperture value can similarly be controlled during the display of the live view before the release button is half pressed.

In the present embodiment, the present invention is applied to the general digital camera, but the present invention is not limited to this embodiment. Needless to say, the present invention may be applied to digital camera units disposed in various portable devices, and digital cameras for exclusive use to be mounted to various devices such as a microscope and binoculars. The present invention is applicable to any camera as long as a photography target can be recorded in the camera.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera in which a movie image is displayed and/or recorded, comprising:
    a mirror section which is arranged in a photographing optical path and which separates, in first and second directions, a subject luminous flux transmitted through a photographing lens;

a movie image output section which receives the subject luminous flux separated in the first direction to output movie image data;

a focal detecting section which receives the subject luminous flux separated in the second direction during acquisition of the movie image to detect an out-of-focus amount of the photographing lens with a phase difference detection system;

a focal adjustment section which adjusts a focus of the photographing lens based on the out-of-focus amount;

an aperture mechanism disposed in the photographing lens; and a setting section which sets an aperture value of the aperture mechanism based on brightness of a subject during the acquisition of the movie image, a movable range of the aperture mechanism being limited to a range between the open aperture value and a predetermined aperture value, wherein, in a case the aperture value calculated based on a subject image signal is not within the range between the open aperture value of the photographing lens and the predetermined aperture value, the setting section sets the image pickup conditions of an image pickup section again so that the aperture value calculated based on the subject image signal falls within the range between the open aperture value of the photographing lens and the predetermined aperture value.

2. The digital camera according to claim 1, wherein the movable range of the aperture mechanism is a range in which focal detection precision of the focal detecting section does not deteriorate.

3. The digital camera according to claim 1, wherein the movable range of the aperture mechanism is determined in accordance with detection precision of the focal detecting section.

4. The digital camera according to claim 1, wherein the first direction is a transmission direction of the mirror section, and the second direction is a reflection direction of the mirror section.

5. The digital camera according to claim 1, wherein the movie image output section receives the subject luminous flux transmitted through the mirror section, and the focal detecting section receives the subject luminous flux reflected by the mirror section.

* * * * *